United States Patent

[11] 3,595,284

| [72] | Inventor | Adrian L. Landers<br>Many, La. |
|---|---|---|
| [21] | Appl. No. | 769,174 |
| [22] | Filed | Oct. 21, 1968 |
| [45] | Patented | July 27, 1971 |
| [73] | Assignee | A.D.C.O. Mfg. Co., Inc.<br>Many, La. |

[54] TREE HARVESTING METHOD AND APPARATUS
21 Claims, 12 Drawing Figs.

[52] U.S. Cl. ..................................................... 144/2 Z,
144/3 D, 144/309 AC
[51] Int. Cl. ....................................................... A01g 23/02
[50] Field of Search ........................................... 144/2 Z, 3
D, 208, 34, 309 AC; 214/3; 180/42—44

[56] References Cited
UNITED STATES PATENTS

| 2,948,311 | 8/1960 | McCollum | 143/32 |
| 3,269,437 | 8/1966 | Busch | 144/2 |
| 2,843,165 | 7/1958 | Sherron | 144/3 X |
| 2,989,097 | 6/1961 | Bombardier | 144/208 |
| 3,063,173 | 11/1962 | Wardle | 180/42 |
| 3,252,487 | 5/1966 | Larson et al. | 144/2 |
| 3,340,912 | 9/1967 | Williams et al. | 144/2 |
| 3,414,072 | 12/1968 | Hodges et al. | 180/43 |
| 3,464,468 | 9/1969 | Thompson et al. | 144/3 |

*Primary Examiner*—Gerald A. Dost
*Attorneys*—Edmund F. Bard and Donald H. Fidler ABSTRACT: An improved self-propelled, four-wheel tree harvester is disclosed having an improved delimber assembly mounted on its forward end, and having a gripping feedworks suspended beneath its chassis and between its wheels for pulling a felled tree through the delimber assembly. The harvester operates to shear off a standing tree at ground level in one shearing stroke. After the tree falls, the harvester straddles the trunk, grips the trunk with the feedworks and positions its delimbers about the trunk. Thereafter, the feedworks draws the felled tree through the delimber in one substantially continuous cycle of travel.

Adrian L. Landers
INVENTOR.

BY Arnold, Roylance,
Kruger & Durkee
ATTORNEYS

Adrian L. Landers
INVENTOR.

BY Arnold, Roylance,
Kruger & Durkee
ATTORNEYS

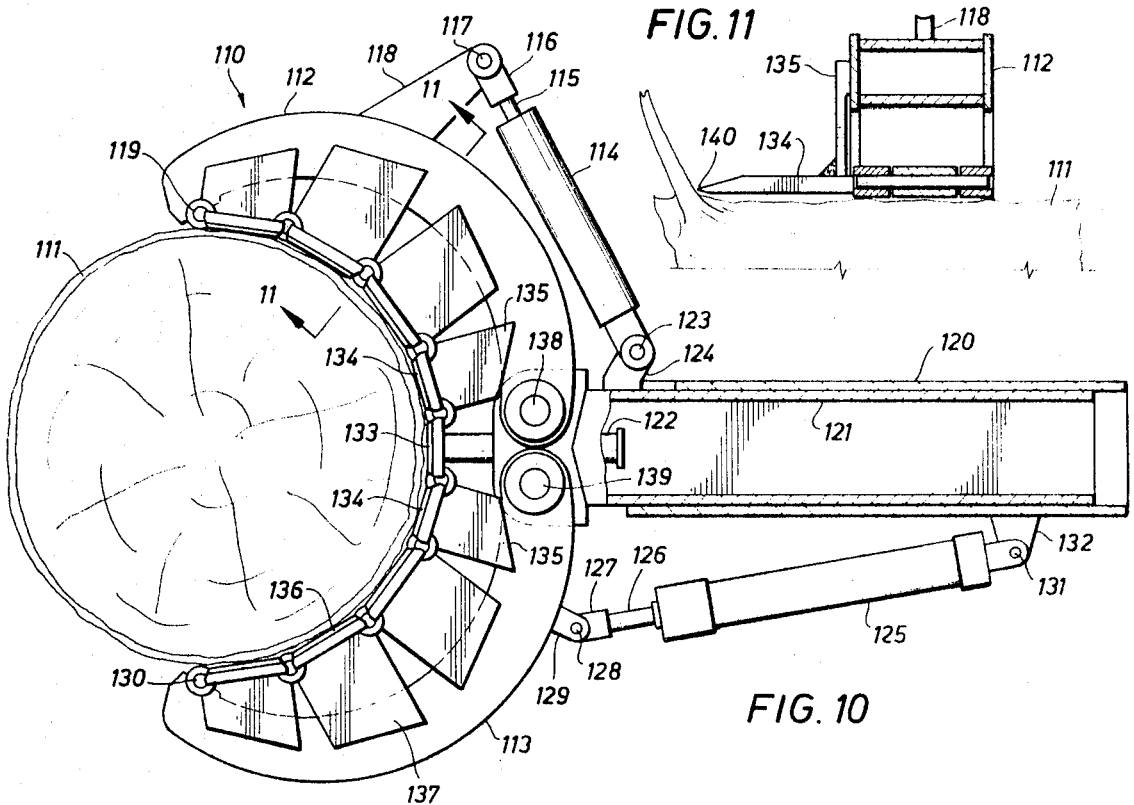
FIG. 11
FIG. 10
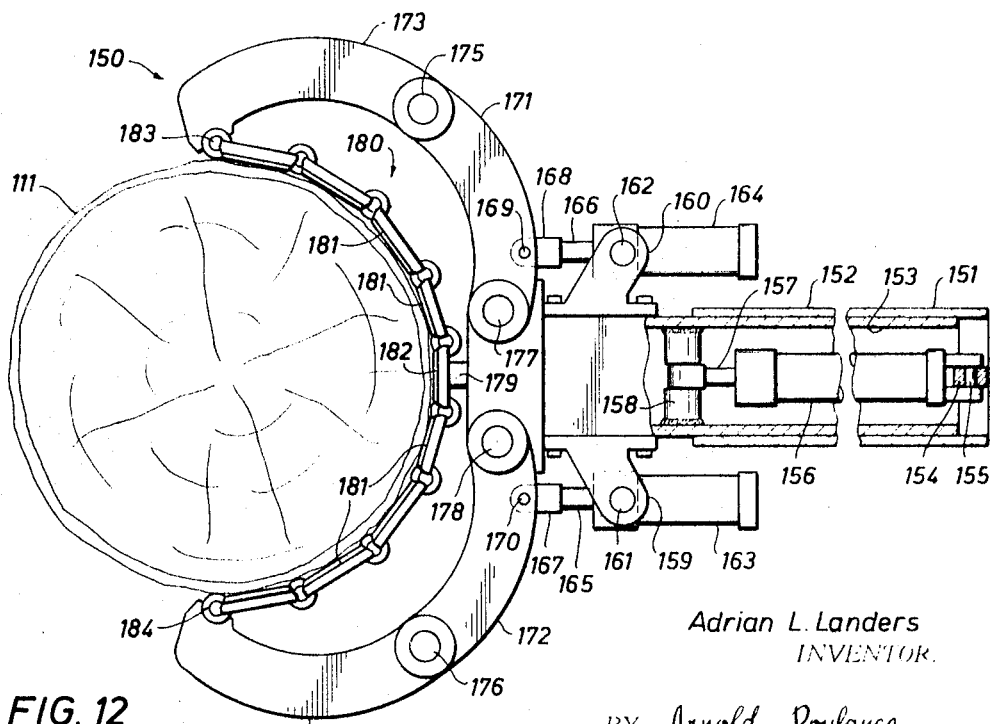
FIG. 12
Adrian L. Landers
INVENTOR.
BY Arnold, Roylance,
Kruger & Durkee
ATTORNEYS

TREE HARVESTING METHOD AND APPARATUS

BACKGROUND OF INVENTION

This invention relates to tree harvesting methods and apparatus, and more particularly relates to improved methods and apparatus for delimbing felled trees.

It is well known that trees are felled for the purpose of providing both lumber and wood pulp. Depending upon how large and straight is the tree, the tree is felled and thereafter delimbed and detopped to provide either a saw log or a chip log, or the like.

Conventional logging techniques are still largely manual in character, although power saws and the like are now widely used. Accordingly, many types of mechanical tree harvesters have been proposed from time-to-time, whereby the manual aspects of felling and delimbing trees can be substantially eliminated or reduced. However, such harvesting equipment as has been found useful has generally been utilized for special applications only, and no such device or equipment has hitherto been found satisfactory for general usage.

For example, it will be obvious that any tree harvester capable of handling standing trees having a trunk diameter of 12—30 inches or larger must, of necessity, be quite massive in construction. However, the type of massive equipment hitherto proposed for tree harvestation has been extremely difficult for this reason to move about in the type of irregular terrain where timber stands are normally located. Moreover such equipment is extremely difficult to maneuver about without damage to smaller growth, and thus such equipment has usually been employed only for "clear cutting" wherein an area is almost completely denuded of standing timber.

Another factor of even greater importance is that only the lower two-thirds of the length of a tree (generally) is useful for saw log purposes. On the other hand, the entire length of a chip log is usable for wood pulp. For this reason, those mechanical tree harvesters which have been successful for felling and delimbing saw log trees in special instances have wasted the upper third of all trees which were cut for purposes of wood pulp.

These disadvantages of the prior art have been overcome with the present invention, and novel tree-harvesting methods and apparatus are disclosed wherein felled trees may be completely delimbed in one continuous cycle or stroke.

SUMMARY OF INVENTION

In a preferred embodiment of apparatus constructed and operated according to the concept of the present invention, a four-wheeled, diesel-powered vehicle is provided with a delimber assembly portion including a pair of confronting chains of knives, each chain being connected between the outer ends of a pair of pivotally connected arms. Each pair of arms is further mounted in a hinged manner on a movable support assembly. A gripping feedworks, which is located centrally beneath the chassis of the harvester, and is composed of a pair of selectively positionable flights or endless chains of moving links adapted to engage the fallen tree. Each such flight is rotatable oppositely of the other flight.

In operation, the harvester is driven up to the tree selected to be felled, and a shearing assembly mounted on the forward end of the vehicle may be used to shear off the tree at ground level on one single stroke.

After the tree is felled, the shearing assembly is then preferably raised to an elevated and retracted position, and the harvester may then be driven forward to straddle the large end of the fallen tree. The two traveling belts or flights of the feedworks may then be lowered and then closed together to grip the stub or butt end of the tree trunk. Thereafter, the arms supporting the two chains of delimbing knives may be lowered about the tree trunk and brought together in a gripping manner whereby the two chains of delimbing knives will each laterally encircle at least one-half of the circumference of the tree trunk. The cutting edges of the delimbing knives will be directed up the tree trunk toward the branches. Further, one of the two chains of delimbing knives should be located forwardly of the other chain, since the two chains will progressively encircle a greater proportion of the circumference of the trunk as the knives progress from the larger end of the trunk toward the smaller end, whereby the two knife chains will not engage and interfere with each other.

The feedworks may then be activated, and the two flights will rotate to pull the tree between the right and left pairs of wheels of the stationary harvester and toward its rear. In those cases where larger trees with abnormally large limbs are sought to be harvested, the harvester may be "walked" forward along the felled tree by means of the wheel drives as well as the feedworks. In either case, the delimber knives encircling the tree will function to conveniently slice or shear off the branches progressively "up" any portion or all of the length of the fallen tree as desired. Alternatively, if the tree has fallen between two closely spaced other trees which are to be preserved, and if it is inconvenient to delimb the tree in the particular location where it has been felled, the flights may be stopped and the feedworks held in gripping engagement with the tree trunk, whereby the harvester can then carry or drag the tree to a more convenient location for delimbing.

It will be apparent that since both the delimber and shearing assemblies may be raised to a retracted overhead position when not in use, the harvester may be easily maneuvered about even in a relatively dense forest without causing unreasonable damage to adjacent trees which are of value and which are sought to be preserved. Moreover, the preferred embodiment of the present invention has a relatively short wheelbase, as compared to the harvesters of the prior art, and this greatly facilitates maneuverability. The two parallel shearing booms extending forwardly of the harvester need be spaced apart only enough to be able to clear the tree intended to be cut, and they need only be long enough so that there is adequate clearance between the two shearing knives, when the closure member is closed and locked about the back side of the standing tree, and when the large shearing knife is in a retracted position.

A further feature of the apparatus of the present invention is the large amount of underneath clearance provided below the harvester, and between its wheels, by virtue of the straddling configuration of the equipment. This permits the harvester to harmlessly roll over smaller trees which would otherwise be crushed by the harvesters of the prior art.

Another feature of the foregoing apparatus, is that the feedworks is preferably centrally located below the harvester chassis, and the fact that each flight may be movable independently of the other. This permits the harvester to straddle and grip the fallen tree more firmly and at any location along the length of the tree desired, whereby the tree may be dropped at any time and at any location chosen by the operator.

The harvester is designed to be operated by one man, although a second man may act as a "spotter" to assist in guiding the operator in maneuvering the harvester to the most advantageous location. Thus, a tree may be felled, delimbed and detopped within an average time interval of one minute with a crew not exceeding two men. Even the largest and most diligent and skilled crew of workmen cannot fell, delimb and detop a large tree within such a short interval, even when working furiously with all of the conventional power saws and other like equipment which is usually available.

These and other features and advantages of the present invention will be apparent from the following detailed description, wherein reference is made to the figures of the accompanying drawings.

DRAWINGS

FIG. 10 is a pictorial representation, partly in cross section, of another form of delimber apparatus different from the apparatus depicted generally in FIGS. 6 and 7, but embodying the concept of the present invention.

FIG. 11 is also a pictorial representation, partly in cross section, of another further form of delimber apparatus different from the apparatus depicted generally in FIGS. 6, 7 and 10, but also embodying the concept of the present invention.

FIG. 12 is a pictorial representation, partly in cross section, of a still further form of delimber apparatus different from the apparatus depicted in FIG. 11 but also embodying the concept of the present invention.

DETAILED DESCRIPTION

Figure 1:
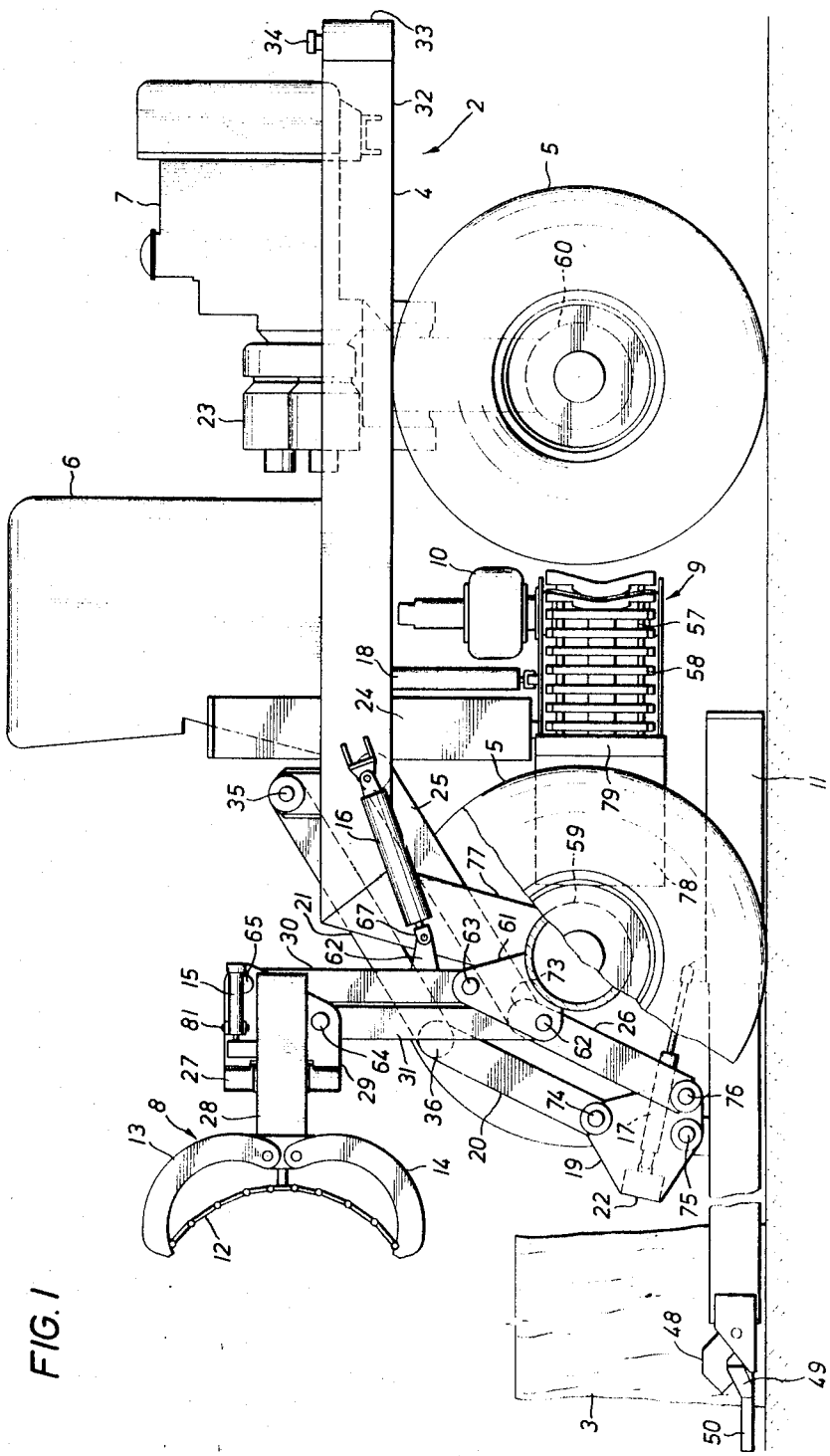
FIG. 1 is a pictorial and partially cutaway side view of the general configuration of an exemplary form of tree harvester incorporating the concept of the present invention, and includes a representation of the basic details of a suitable feedworks, a suitable shearing assembly, and a suitable delimbing assembly embodying a representative form of the present invention.

Referring now to FIG. 1, there may be seen a side view of apparatus more particularly depicted and described in the aforementioned copending patent application Ser. No. 769,338 filed Oct. 21, 1968. In particular, there may be seen a tree harvester 2 arranged in confronting relationship to a standing tree 3 sought to be felled, delimbed and detopped. More particularly, the depicted tree harvester 2 may be seen to include a suitable chassis 4 which supports a cab 6 and diesel engine 7. The chassis 4 is preferably supported by four suitably spaced apart wheels 5, each independently mounted thereon as will hereinafter be apparent. A suitable delimber assembly 8, and a feedworks assembly composed of a pair of side-by-side flights 9 and 9A, (See FIG. 3) may also be provided. Each flight 9 and 9A is preferably separately powered, and thus suitable hydraulic motor and gear reduction assemblies 10 and 10A are provided to power each flights 9 and 9A. The harvester 2 may also be seen to include a suitable shearing assembly 11 which projects out and about the tree 3, and which includes a horizontally-arranged shearing knife (not depicted) which may be hydraulically thrust forward to shear off the tree 3 at ground level.

Referring again to FIG. 1, and to the delimber assembly 8, it may be seen to include an adjustable pair of curved gripping arms 13 and 14 which are pivotally joined to partially encircle the tree 3 for delimbing purposes after the tree 3 has been felled. The delimber assembly 8 will hereinafter be seen to include two such assemblies, but only one of which is depicted in FIG. 1 for purposes of simplicity. The outer ends of the delimber gripping arms 13 and 14 may be seen to support a suitable cutting assembly 12 which may be a chainlike assembly of knives as will hereinafter be explained, and which is connected loosely to the outer or free traveling ends of the gripping arms 13 and 14. The gripping arms 13 and 14 may be rotated hingedly as a unit through a 90° horizontal arc or angle by means of an actuating cylinder 15, the point of rotation being the vertically positioned hinge pin 27, whereby the chain of knives forming the cutting assembly 12 may be wrapped about one-half or more of the circumference of the trunk of the fallen tree 3.

As may be seen, a suitable hydraulic actuating cylinder 16 is provided for lowering and raising the delimber assembly 8 as desired. Another hydraulic actuating cylinder 17 is provided for the purpose of rotating the shearing assembly 11 about pivot pin 75. Another suitable hydraulic actuating cylinder 18 may be included for the purpose of inwardly and outwardly tilting the left-hand flight 9 of the feedworks assembly portion of the depicted tree harvester 2.

The shearing assembly 11 may be any suitable means for felling a standing tree 3 or the like. As depicted in FIG. 1, however, a suitable shearing assembly 11 may include a frame composed in part of a pair of forwardly thrust arm members arranged in parallel and spaced apart a distance such that the outer ends of these arms can be positioned on opposite sides of the tree 3. A large shearing knife (not depicted) may be slidably disposed between the two parallel arms, with its cutting edge directed toward the trunk of the tree 3. A hydraulic actuator, or the like, may be included to drive the knife forward to shear through the tree 3 at ground level, and also to retract the knife after the tree 3 has been felled.

As may be seen in FIG. 1, the left side of the shearing assembly 11 may be interconnected with the harvester 2 by means of upper linking arms 21 and 25, which are connected to lower linking arms 20 and 26 respectively. The lower end of linking arm 20 is connected to a suitable shearing link 19 by means of a pivot pin 74, and the lower end of the other linking arm 26 is connected to the shearing link 19 by means of pivot pin 76. A similar supporting assembly (not depicted) may be used to connect the right side of the shearing assembly 11 to the harvester 2. Accordingly, a spacing bar 22 may be provided which extends perpendicularly from the forward portion of the left-hand shearing link 19 to another similar right-hand shearing link (not depicted in FIG. 1) for the purpose of stabilizing the entire shearing assembly 11.

The harvester 2 may also include a suitable diesel engine 7 suitably arranged to actuate one or more hydraulic pumps 23 for the purpose of supplying adequate hydraulic power throughout the entire harvester 2. The chassis 4 may be composed of a pair of spaced-apart parallel longerons 32 (only one depicted in FIG. 1) and connected at the rear of the harvester 2 by a bumper or cross member 33 housing a suitable fuel tank indicated by the fuel tank cap 34 depicted. Each longeron 32 may be seen to be provided with a downward and forwardly directed wheel strut 77 fixedly connected to the motor housing 59 of one of the two forward wheels 5. Each of the two front wheels 5 may be separately mounted and driven by an individual wheel drive motor (not depicted), whereby each wheel 5 may, if desired for special maneuvering purposes, be rotated and actuated independently of the rotation of any of other wheels 5.

A bracket 61 having a generally triangular configuration may be seen to be fixedly connected to the motor housing 59 on the depicted forward wheel 5 and may be provided with pivot pins 62 and 63 for maintaining support arms 31 and 30 of the delimber assembly 8. The upper ends of support arms 30 and 31 may be pivotally connected to a suitable hinge assembly 29 and to a housing 28 containing the means for actuating the gripping arms 13 and 14. More particularly, support arm 31 is pivotally connected to the hinge assembly 29 by means of pivot pin 64, and support arm 30 is pivotally connected thereto by means of pivot pin 65.

It may be noted that linking arm 20 is not directly connected to linking arm 21, since the adjacent ends of these two components are preferably spaced laterally one from the other by means of a suitable stiff link 36. Similarly, the upper end of linking arm 26 is fixedly attached in a laterally spaced-apart manner to the lower end of linking arm 25 by means of another such stiff link 73. Alternatively, linking arms 20 and 21 and linking arms 25 and 26, respectively, need not be spaced apart and may be a single straight arm member. The upper end of linking arm 21 may be pivotally connected to the chassis 4 by means of a suitable pivot pin 35 mounted on a bracket portion of the adjacent longeron 32, and the other upper linking arm 25 may be similarly pivotally connected to a lower portion of the same longeron 32 by means of another pivot pin or other suitable supporting member hidden in FIG. 1.

Each of the two flights 9 and 9A in the feedworks will be described in greater detail with respect to other figures of the accompanying drawings. It will be noted in FIG. 1, however, that the flight 9 is composed of an endless gripping chain 57 which includes a plurality of gripping link members 58 rotatable in a traveling manner by means of the aforementioned motor and reduction assembly 10. More particularly, the forward portion of the chain 57 may be seen to be protected by a suitable housing 78 having a rearward flared end portion 79.

The shearing assembly 11 portion of the harvester 2 may be seen to include a locking arm 50, which is hingedly mounted on the end of one of the two parallel members, and which may be swung horizontally about the opposite side of the tree 3 and then latched to the other parallel member by means of a suitable latching arm 48 engaging a latch member 49.

As previously stated, the feedworks may be composed of a pair of spaced-apart but matching flights 9 and 9A which are each respectively composed of endless chains 57 and 57A of spaced-apart gripping link members 58 and 58A, respectively. The chains 57 and 57A may be separately and independently driven by actuating motor and gear reduction assemblies 10 and 10A, respectively, in opposite directions to each other, whereby the inside or adjacent confronting portion of each of the gripping chains 57 and 57A both travel towards the rear wheels 5, and whereby their outer surfaces travel towards the forward wheels 5. When a fallen tree 3 is gripped between the two chains 57 and 57A, it will tend to be urged or pulled towards the rear of the tree harvester 2.

Figure 2:
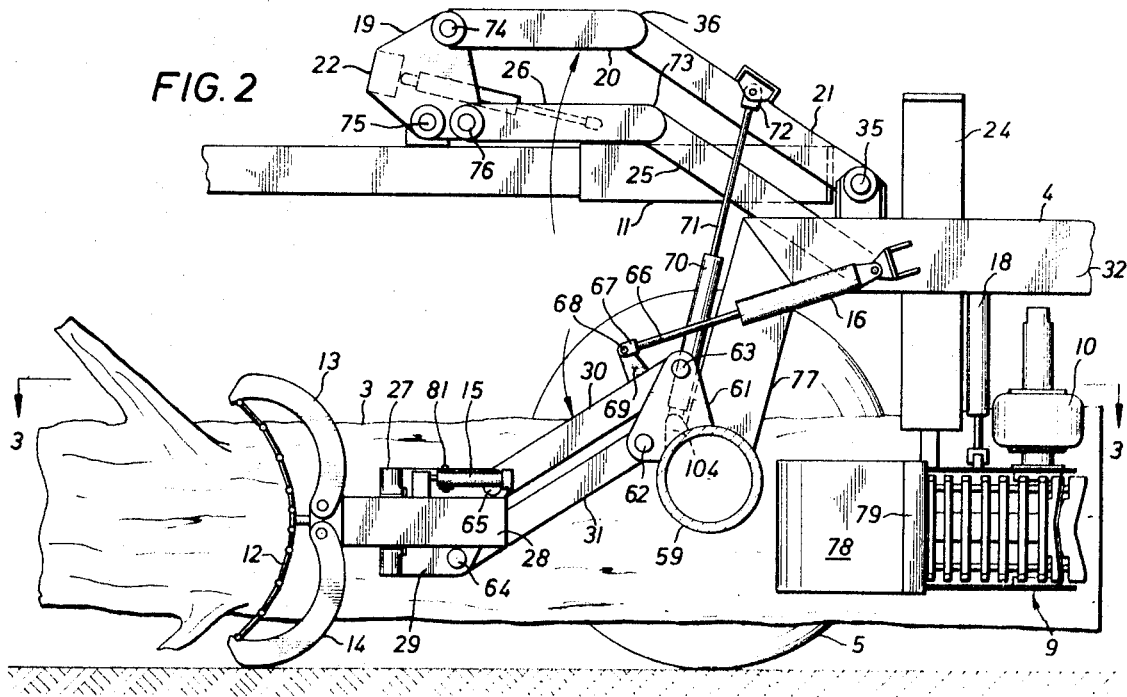
FIG. 2 is a pictorial side-view representation, partially cutaway, of the form of the delimber assembly depicted in FIG. 1 when positioned preparatory to delimbing a fallen tree.
Figure 3:
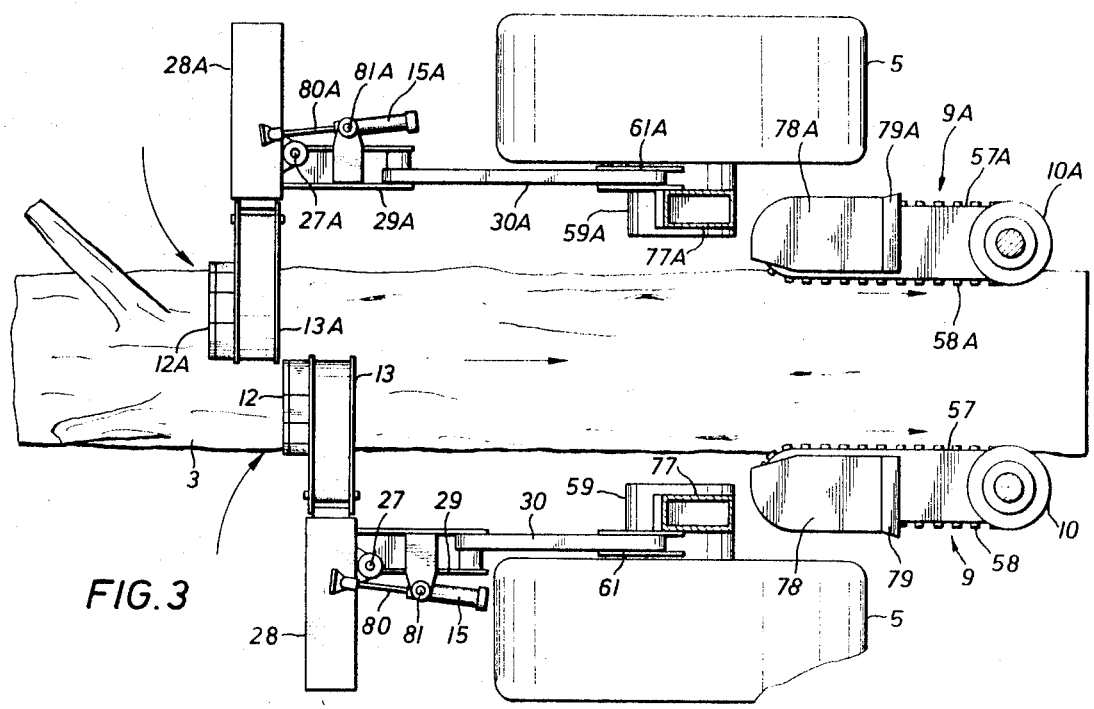
FIG. 3 is a pictorial top-view representation of the delimber assembly depicted in FIG. 2, and further showing the delimber assembly when closed for delimbing purposes about a fallen tree.

As previously stated with reference to FIG. 1, the delimber assembly 8 is composed of a pair of gripping and delimbing subassemblies, only one of which is specifically illustrated in FIG. 1, and reference may be had to FIGS. 2 and 3 for illustration of both assemblies. Referring now to FIGS. 2 and 3, there may be seen a left-hand delimbing subassembly including a cutting assembly 12 formed of a chain of knives suspended between the gripping arms 13 and 14, and a similar right-hand delimbing subassembly formed of a similar cutting assembly 12A suspended between the outer ends of gripping arms 13A and 14A. Each subassembly is thus adapted to oppositely engage the circumference of the trunk of a tree 3. Both sets of gripping arms 12 and 12A, and 13 and 13A, are rotatable about pivot pins 27 and 27A, respectively, through 90° angles to and from each other, by means of actuating cylinders 15 and 15A. More particularly, actuating cylinder 15 is pivotally supported by pivot pin 81, and its associated piston rod 80 is pivotally connected at its free traveling end to housing 28. Similarly, cylinder 15A is pivotally supported by pivot pin 81A, and its corresponding piston rod 80A is pivotally linked at its free traveling end to housing 28A. In addition, gripping arms 13 and 14 are arranged to be raised and lowered by means of actuating cylinder 16, but are rotated horizontally as a unit about hinge pin 27 by means of cylinder 15. Similarly, gripping arms 13A and 14A are rotated horizontally as a unit by actuating cylinder 15A, and are raised and lowered by means of actuating cylinder 16A.

Referring again to FIGS. 3 and 4, there may be seen an illustration of how the delimber assembly 8 may be moved into delimbing engagement with the trunk of the tree 3 after the tree 3 has been sheared and felled. The delimber assembly 8 is normally carried in an elevated and retracted position, as illustrated in FIG. 1, except when the delimber assembly 8 is positioned to delimb a fallen tree 3. Accordingly, after the tree 3 has been felled and the harvester 2 has moved to straddle the butt end of the trunk of the tree 3, the tree 3 is gripped securely by moving the two flights 9 and 9A into tight engagement with opposite sides of the trunk of the tree 3 as illustrated in FIG. 3. Thereafter, the delimber assembly 8 is lowered and engaged with the tree 3 at a forward location immediately behind (or below) the lowest limb on the fallen tree 3. More particularly, the left-hand delimbing subassembly is lowered to ground level for engagement with the tree 3 by means of the actuating cylinder 16, and the right-hand subassembly is similarly lowered to ground level by actuating cylinder 16A. In this lowered position, the piston rod 66 on the left-hand subassembly may be seen to be fully extended, whereby its free traveling end and the clevis 67 attached thereto will urge arms 30 and 31 into a lower extended position. In FIG. 3, it may be seen how gripping arms 13 and 14 have been rotated 90° horizontally toward the tree 3, by means of actuating cylinder 15, whereby the chain of delimbing knives composing the cutting assembly 12 are wrapped or urged laterally about one-half or more of the circumference of the felled tree 3. In addition, FIG. 3 also illustrates how arms 13A and 14A have similarly been pivotally rotated about hinge pin 27A in the opposite direction towards the tree 3 by means of actuating cylinder 15A, whereby the chain of knives composing the cutting assembly 12A are wrapped laterally at least halfway about the opposite side of the tree 3. Accordingly, the cutting assemblies 12 and 12A will completely encircle the trunk of the tree 3, whereby all limbs will be stripped from the tree 3 as it is drawn or pulled between wheels 5 toward the rear of the harvester 2 by the flights 9 and 9A in the feedworks.

Referring again to FIG. 3, it may be noted that arms 30A and 31A are longer than arms 30 and 31 whereby the chain of knives forming the cutting assembly 12A are positioned forwardly of the cutting assembly 12. Accordingly, as the larger end of the tree 3 is drawn between the wheels 5 and to the rear of the tree harvester 2, both cutting assemblies 12 and 12A will tend to be wrapped more and more about the circumference of the tree 3, whereby the entire circumference of the trunk of the tree 3 is constantly encircled by knives. Thus, it is desirable that the cutting assembly 12 be positioned either ahead of or behind the cutting assembly 12A, whereby the knives in each assembly 12 and 12A will not engage or interfere with each other as they progressively close more and more about the trunk of the tree 3.

Figure 4:
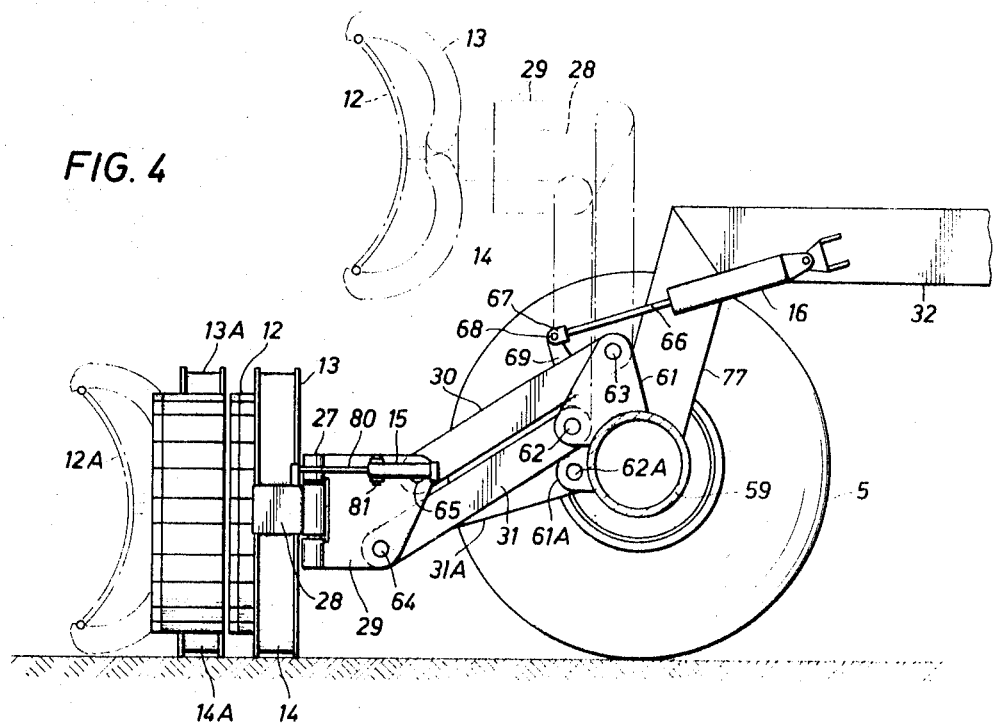
FIG. 4 is another more detailed view of the various components of one-half of the delimber assembly depicted in FIGS. 2 and 3.
Figure 5:
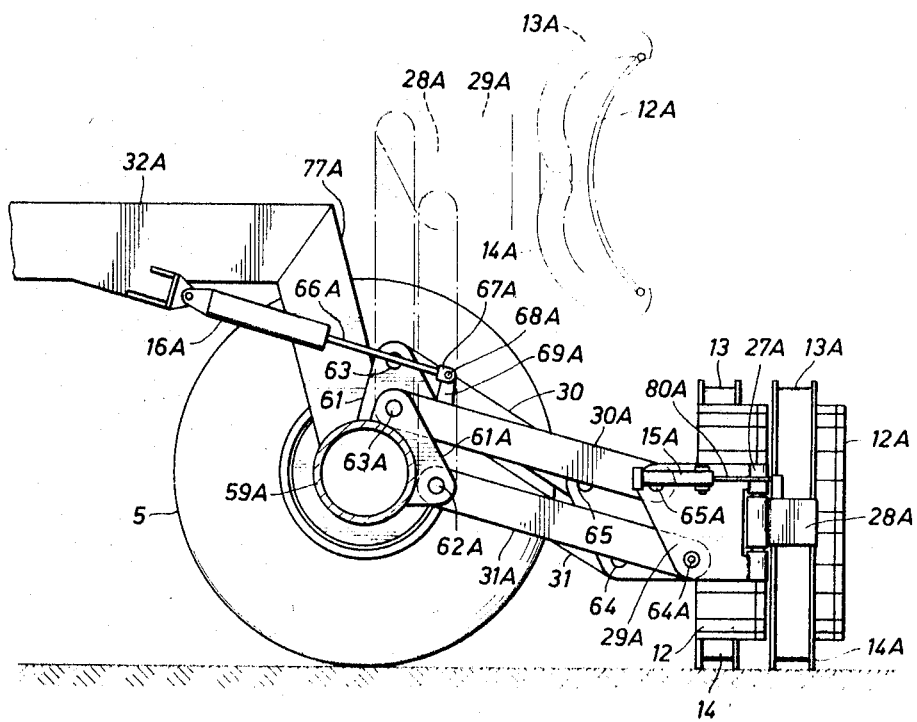
FIG. 5 is a further more detailed view of the various components of the other half of the delimber assembly depicted in FIG. 1—4.

Referring now to FIGS. 4 and 5, it may be seen that the staggered position of the delimber gripping arms 13 and 14, relative to the other gripping arms 13A and 14A, is established by means of bracket 61 which is positioned on the wheel motor housing 59 differently from bracket 61A on motor housing 59A. More particularly, bracket 61 may be seen to be shaped differently from bracket 61A, whereby pivot pins 62 and 63, which pivotally connect arms 31 and 30 respectively to bracket 61, is located relatively higher above the center point or axis of housing 59. On the other hand, bracket 61A is shaped and is mounted on housing 59A whereby pivot pins 62A and 63A are located relatively lower and closer to the centerpoint of housing 59A than are pins 62 and 63. Accordingly, when the delimber assembly 8 is raised to a fully retracted and elevated posture, gripping arms 13 and 14 will be positioned substantially opposite and in lateral alignment with gripping arms 13A and 14A, whereby the difference in length between support arms 30 and 31, and 30A and 31A, respectively, is compensated. Likewise, actuating cylinder 16 may be seen to be located above the horizontal plane in which actuating cylinder 16A is located, whereby both cylinders 16 and 16A are provided with the same angle-of-attack, and whereby the cylinders 16 and 16A both support the same equivalent load and have the same stroke.

Figure 8:
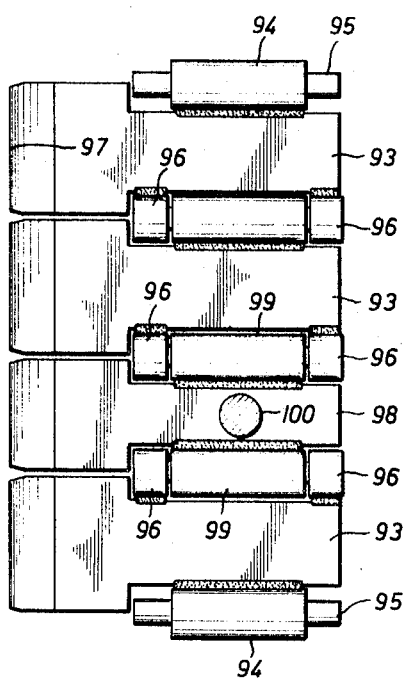
FIG. 8 is a detailed pictorial representation of a portion of a chain of cutting knives suitable for use with the delimbing assembly depicted in FIGS. 6 and 7.
Figure 9:
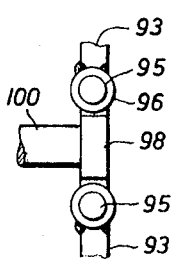
FIG. 9 is another different pictorial view of a portion of the cutting knives depicted in FIG. 8.

Referring now to FIG. 8, there may be seen a more detailed representation of an exemplary form of cutting knives such as those in cutting assemblies 12 and 12A. More particularly, a plurality of individual knives 93 may be linked together in a chainlike manner by means of a loop or hinge portion 94 on one side and a pair of hinge loops 96 on the other side. The hinge portion 94 of each knife 93 may further be seen to be adapted to fit between the hinge loops 96 on each knife 93 next adjacent thereto, and further to include a hinge pin 95 for rotatable engagement in the hinge portion 94 on the next oppositely adjacent knife 93. As further indicated, the cutting edges 97 of each knife 93 is aligned with the cutting edges 97 of the other knives 93 in the chain, whereby the array of edges 97 form the cutting portion of cutting assembly 12 in FIG. 1. The hinge loops 96 and hinges 94 as illustrated in FIG. 9 and elsewhere are larger in diameter than the thickness of the knives 93. Thus, the hinges space the cutting edges of the knife blades from the bark of a tree. As illustrated in FIG. 8, the knives have forward cutting edges 97 and rearward recesses which receive the hinges. With the rearward recesses, the cutting edges of adjacent knife blades are proximate to one another to provide a nearly continuous cutting surface.

It may be noted that the knife 98 in the center of the chain of knives is provided with suitable hinge pins 99 on both sides, and that it is also narrower in width than any other knife 93 in the chain (other than the two knives 93 on each side thereof). In addition, the center knife 98 is preferably mounted on the free traveling end of a guide arm 100. Referring to FIG. 9, there may be seen an alternate view of the center knife 98 illustrating how its hinge pins 95 interconnect with the adjacent knives 93 in the chain. In addition, there may be seen how center knife 98 is mounted in a perpendicular manner on the end of the guide arm 100.

Figure 6:
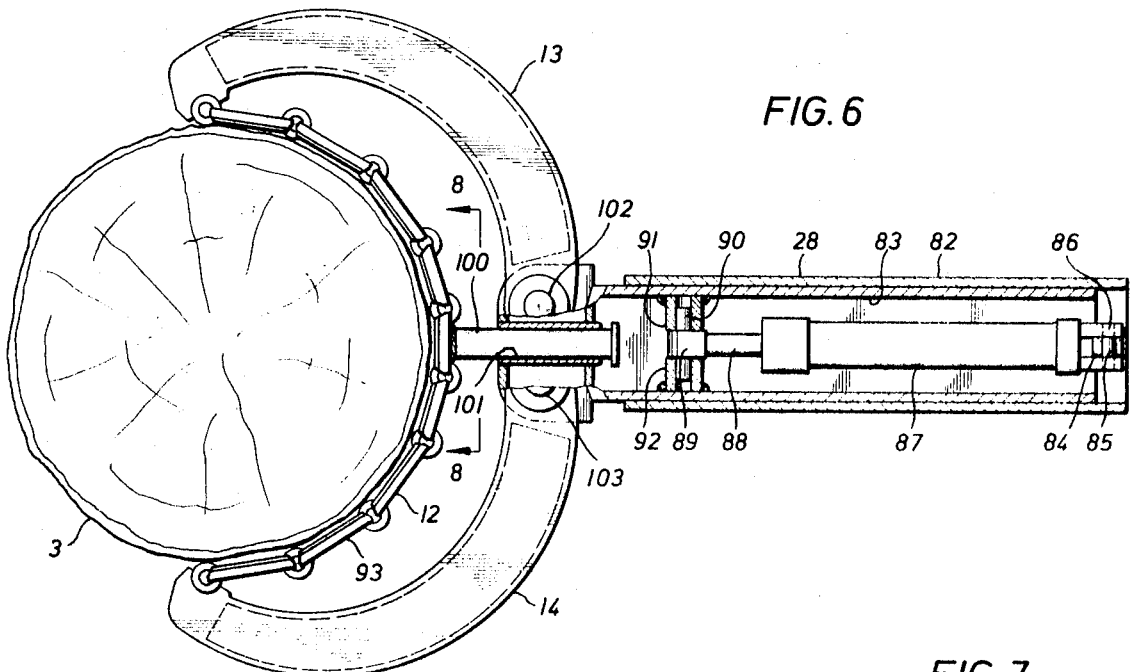
FIG. 6 is a detailed representation, partly in cross section, of the cutting portion of one-half of the delimbing assembly when such cutting portion is closed about a portion of the tree trunk of relatively large circumference.
Figure 7:
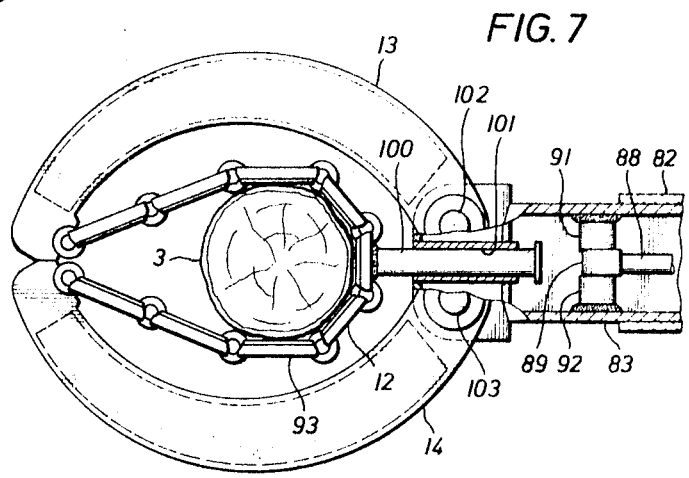
FIG. 7 is a similar representation of the apparatus depicted in FIG. 5, when such cutting portion is closed about a portion of the tree trunk of smaller circumference.

Referring now to FIGS. 6 and 7, there may be seen an illustration of the different configurations of gripping arms 13 and 14 as they are urged about the circumference of the tree 3 at two different diametrical locations. In particular, when the gripping arms 13 and 14 are clamped about the circumference of the tree 3 at a larger diametrical location, the chain of knives in assembly 12 will only encircle a little more than one-half of the trunk of the tree 3. However, as the tree 3 is drawn between the gripping arms 13 and 14, the arms 13 and 14 will tend to be urged closer about the trunk of the tree 3 by the action of the actuating cylinder 87 to adjust for the gradually decreasing diameter or circumference of the trunk. As illustrated in FIGS. 6 and 7, an actuating cylinder 87 may be mounted within an inner sleeve or jacket 83 which, in turn, is slidably enclosed in an outer jacket 82. The cylinder 87 is provided with a clevis 86 and clevis pin 85 fixed to a crossbar 84 which, in turn, is mounted diametrically in the end of outer cylinder 82. A piston rod 88 is slidably disposed within the cylinder 87, and is provided at its free traveling end with a clevis 89 which is rotatably connected to a clevis pin 90. Pin socket members 91 and 92 may be seen to be located at the opposite end of the inner jacket 83, and are positioned to rotatably support the clevis pin 90. Accordingly, when the piston rod 88 is extended from the actuating cylinder 87, this will push the inner jacket 83 out of the outer jacket 82, since the outer jacket 82 is anchored to the hinge assembly 29. This outward movement of the inner jacket 83 operates to urge the outer ends of the curved gripping arms 13 and 14 away from the hinge assembly 29, and to close them about the circumference of the tree 3, due to pivotal movement of arms 13 and 14 about pivot pins 102 and 103. In addition, it will be seen that the guide arm 100, which supports the center knife 98, is longitudinally movable within the guide arm bushing 101 to maintain the center knife 98 urged against the surface of the tree 3 notwithstanding a decrease of circumference of the tree 3. In other words, as the tree decreases in diameter, the piston rod 88 will urge the gripping arms 13 and 14 forward from the outer cylinder 82, thereby pulling the center knife 98 and its adjacent knives 93 into close engagement with the adjacent surface or bark of the tree 3. The guide arm 100 will shift forward through the guide arm bushing 101 to facilitate this action. In this respect, it should be noted that the knives 93 are preferably not all of the same width, and that the knives 93 which are nearer the center knife 98, are preferably narrower in width than the knives 93 which are adjacent the ends of arms 13 and 14. This difference in width of the knives 93 in the chain 12 enables the chain 12 to be maintained in close shearing engagement with the tree 3, as will be apparent from FIG. 7.

It should be further noted that when the ends of gripping arms 13 and 14 have closed together as depicted in FIG. 7, the guide arm 100 will no longer tend to be pulled outwardly of and from the bushing 101 and housing 28. Instead, the entire subassembly will be urged against the tree 3 by the extending piston rod 88, and the guide arm 100 will tend thereafter to be urged gradually in the opposite direction back through the bushing 101 into the housing 28.

Referring now to FIG. 10, there may be seen another different embodiment of a delimber assembly 8, such as that represented generally in FIG. 1. More particularly, FIG. 10 depicts a delimber subassembly 110 engaged for delimbing purposes with the trunk of a representative tree 111, and composed of an upper gripping arm 112 and lower gripping arm 113 interconnected in the manner of a clamping means. As may be further seen, the upper gripping arm 112 is pivotally connected in a hingelike manner to the outer or nether end of a sleeve or inner jacket 121. In addition, the lower gripping arm 113 is similarly pivotally connected to the same end of the inner jacket 121 by means of pivot pin 139, but on the opposite side of the jacket 121.

The sleeve or jacket 121 may be seen to be telescopically and slidably located within another sleeve or outer jacket 120, and to be provided with a suitable bracket 124 located adjacent the pivot pin 138. A suitable hydraulic cylinder 114 is interconnected with the bracket 124 by means of a suitable pivot pin 123 at one end, and a piston rod 115, which is slidably disposed within the other end of the actuating cylinder 114, is pivotally connected with a bracket 118 located on the upper gripping arm 112 by means of a suitable clevis 116 and clevis pin 117.

As may be further seen in FIG. 10, a suitable bracket 132 may be provided on the outside of the outer jacket 120, and at the other end from the pivot pin 139. The lower gripping arm 113 may be seen to be provided with a similar bracket 129. Accordingly, a hydraulic actuator 125 is pivotally connected at one end to the bracket 132 by pivot pin 131, and a piston rod 126, which is slidably disposed within the other end of the cylinder 125, is pivotally connected at its free traveling end with the bracket 129 by clevis 127 and clevis pin 128.

As indicated, the delimber assembly 110 may be composed of a chain of knives or other cutting implements, such chains being suspended in a slack manner from the upper and lower gripping arms 112 and 113 by means of pivot pins 119 and 130. As may be seen, the center knife 133 is preferably narrower in width than the other knives in the chain, and may be mounted at the free end of a suitable guide arm 122. However, the other knives in the chain are relatively freely movable except for being hingedly joined together at their edges.

Each of the knives 134 in the chain of knives (other than the center knife) may be seen to be provided with suitable knife stop arms 135 and 137, which are each perpendicularly fixedly attached to the base portion of the knives 134 and 136, and which are preferably of a length and configuration such that they will be in continuous abutting engagement with the outermost or forward surface of the upper or lower gripping arms 112 and 113, irrespective of the relative positions of the arms 112 and 113 relative to each other. Accordingly, as the tree 111 is pulled shearingly past the cutting edges of knives 133, 134 and 136, the knife stop arms 135 and 137 will keep the knives in cutting opposition to the tree 111 instead of being carried backward and up from the surface of the tree 111.

Referring now to FIG. 11, there may be seen a representation of a portion of the delimber subassembly 110 depicted in FIG. 10, illustrating how the knife 134 is preferably maintained in a flat shearing position against the surface of the tree 111 with its cutting edge 140 directed towards the limbs. In addition, it may be seen how the knife stop arm 135 is located forwardly of the upper gripping arm 112 adjacent the knife 134, and how the arm 112 tends to move into abutting relationship with the knife stop arm 135. Accordingly, as the tree 111 tends to move oppositely to the cutting direction of the knife 134, the knife stop arm 135 will be pushed against the upper gripping arm 112 and will thereby prevent the knife 134 from being carried along with the tree 111 because of the aforementioned slack in the chain of knives. Furthermore, the knife stop arm 135 tends to receive and bear substantially all of the stress which might otherwise be created in the weaker hinge portions of the knives in the chain.

Referring now to FIG. 12, there may be seen another different delimber subassembly 150, including a suitable actuator housing 151. More particularly, the housing 151 may be seen to be composed of an outer sleeve 152 having an inner sleeve 153 telescopically and slidably disposed therein. A suitable hydraulic actuator 156 may be seen to be pivotally connected by means of a suitable clevis or eye member 154 to a crossbar 155 extending diametrically across the inside of the outer sleeve 152. A suitable piston rod 157, which is slidably disposed in the actuating cylinder 156, may be pivotally interconnected at its free traveling end to a suitable crossbar 158 fixedly mounted diametrically across the inside of the inner sleeve 153. Accordingly, actuation of the cylinder 156 will extend the piston rod 157, and will thereby push the inner sleeve 153 telescopically out of the outer sleeve 152 in substantially the same manner as in FIGS. 6 and 7.

As may be further seen in FIG. 12, suitable brackets 159 and 160 may be provided on opposite sides of the exterior surface of the inner sleeve 153, and actuating cylinders 163 and 164 may be pivotally connected at one end thereto by means of pivot pins 161 and 162. Piston rods 165 and 166, which are slidably disposed in cylinders 162 and 164, respectively, may be pivotally connected at their free traveling ends with arm members 171 and 172 by means of clevises 168 and 167, and clevis pins 169 and 170, respectively.

As may be further seen in FIG. 12, arm members 171 and 172 are each pivotally connected at one end to the free traveling end of the inner sleeve 153 by means of pivot pins 177 and 178. The opposite end of arm member 171 is pivotally connected to the adjacent end of arm member 173 by pivot pin 175, and the opposite end of arm member 172 is pivotally connected to the adjacent end of arm member 174 by means of pivot pin 176. Accordingly, arms 171 and 173 constitute a hinged version of the upper gripping arm 112 depicted in FIGS. 1—10. Similarly, arm members 172 and 174 constitute a hinged version of lower gripping arm 113 depicted in FIG. 10.

As may be further seen in FIG. 12, the delimber subassembly 150 depicted therein also includes a suitable cutting assembly such as the cutting assembly depicted in FIG. 10, but which also may be similar to the cutting assembly depicted in FIGS. 6 and 7. More particularly, a chain of knives may be pivotally connected at one end to the free traveling end of arm member 173 by means of pivot pin 183, and pivotally connected at the other end to the free traveling end of arm member 174 by means of pivot pin 184. The center knife 182 in the cutting assembly may be seen to be mounted on the end of a suitable guide rod 179, and may be seen to be narrower in width than the adjacent knives 181 as hereinbefore explained. Accordingly, actuation of cylinders 163 and 164, together with actuation of cylinder 156, will operate to cause the knives 181 and 182 to progressively encircle a greater proportion of the circumference of the tree 111 as it decreases in diameter. More particularly, the hingelike connection provided by pins 175 and 176 will tend to permit the arm members 171 and 172 to close substantially completely together at pins 175 and 176, whereby the knives 181 adjacent the pins 175 and 176 may be urged back against the surface of very small diameter sections of the tree 111 which might otherwise not be delimbed by conventional techniques.

It will be apparent from the foregoing that other modifications and variations may be made in the structures and procedures described herein without substantial departure from the essential concept of the present invention. Accordingly, it should be clearly understood that the forms of the invention described herein and depicted in the accompanying drawings, are exemplary only and are not intended as limitations on the scope of the present invention.

What I claim is:

1. Apparatus for delimbing a fallen tree or the like, comprising drawing means for drawing said fallen tree longitudinally and generally horizontally along the surface of the earth, and cutting means for positioning on said tree at a location spaced a fixed distance forward of said drawing means and adapted for continuing close encircling engagement with the trunk of said tree as said tree is drawn progressively therethrough by said drawing means, said cutting means including a right-hand cutting means adapted to substantially closely encircle at least one-half of the circumference of said trunk of said tree at a first preselected fixed spacing forward along said tree from said drawing means, and a left-hand cutting means adapted to substantially closely encircle at least one-half of the circumference of said trunk of said tree at a second preselected fixed spacing forward along said tree from said drawing means and different from said first spacing, said right-hand and left-hand cutting means including first and second gripping arms pivotally interconnected for arcuate movement to and from each other, a first chain of knife members suspended slackly between the free traveling ends of said first and second gripping arms and adapted to be wrapped substantially closely about at least one-half of the circumference of the trunk of said tree by said first and second gripping arms, third and fourth gripping arms pivotally interconnected for arcuate movement to and from each other, a second chain of knife members suspended slackly between the free traveling ends of said third and fourth gripping arms and adapted to be wrapped substantially closely about at least the other half of the circumference of said trunk by said third and fourth gripping arms, first actuating and positioning means for urging said first and second gripping arms together about one side of said trunk and for progressively urging said first chain of knives into increasing encirclement of said trunk as said tree is drawn longitudinally and shearingly along said knives by said drawing means, and second actuating and positioning means for urging said third and fourth gripping arms together about the other side of said trunk and for progressively urging said second chain of knives into increasing encirclement of said trunk as said tree is drawn longitudinally and shearingly along said knives by said drawing means, said knife members in said first and second chains each being provided with a cutting edge along one side wherein said cutting edges in each of said chains are arranged tangentially to the trunk of said tree and forwardly from said drawing means to shear off limbs projecting from said tree, said right-hand and left-hand cutting means further including a right-hand mounting means, first pivot means pivotally interconnecting one end of said first gripping arm to one end of said right-hand mounting means at a first pivot location thereon, second pivot means pivotally interconnecting one end of said second gripping arm to said one end of said right-hand mounting means at a second pivot location thereon spaced from said first pivot location on said right-hand mounting means, a left-hand mounting means, third pivot means pivotally interconnecting one end of said third gripping arm to one end of said left-hand mounting means at a first pivot location thereon, fourth pivot means pivotally interconnecting one end of said fourth gripping arm to said one end of said left-hand mounting means at a second pivot location thereon spaced from said first pivot location on said left-hand mounting means, first guide member fixedly attached to the center knife in said first chain of knife members and longitudinally movable between said first and second pivot means and transversely of said first chain of knife members, and second guide member fixedly attached to the center knife in said second chain of knife members and longitudinally movable between said third and fourth pivot means and transversely of said second chain of knife members.

2. The apparatus described in claim 1, wherein said first guide member is also movable generally diametrically of said trunk of said tree in a manner functionally related to the magnitude of the diameter of said trunk adjacent said first chain of knife members and to the magnitude of the arcuate angle between said first and second gripping arms, and wherein said second guide member is also movable generally diametrically of said trunk of said tree in a manner functionally related to the magnitude of the diameter of said truck adjacent said second chain of knife members and to the magnitude of the arcuate angle between said third and fourth gripping arms.

3. The apparatus described in claim 2, wherein said apparatus further comprises a right-hand support arm assembly having said right-hand mounting means hingedly connected at one end for horizontal arcuate movement about said one end of said right-hand support arm assembly to and from the right-hand side of the trunk of said tree, and a left-hand support arm assembly having said left-hand mounting means hingedly connected at one end for horizontal arcuate movement about said one end of said left-hand side of said trunk of said tree.

4. The apparatus described in claim 3, wherein said first and second pivot means are generally vertically spaced apart from each other and wherein said third and fourth pivot means are generally vertically spaced apart from each other.

5. The apparatus described in claim 4, wherein said apparatus further comprises right-hand horizontal positioning means interconnected with said right-hand mounting means and said right-hand support arm assembly for driving said right-hand mounting means and said first and second gripping arms horizontally and arcuately as a unit about the end of said right-hand support arm assembly, and left-hand horizontal positioning means interconnected with said left-hand mounting means and said left-hand support arm assembly for driving said left-hand mounting means and said third and fourth gripping arms horizontally and arcuately as a unit about the end of said left-hand support arm assembly.

6. The apparatus described in claim 5, wherein said center knife mounted on said first guide member is narrower in width than the other knife members in said first chain of knife members, and wherein said center knife mounted on said second guide member is narrower in width than the other knife members in said second chain of knife members.

7. The apparatus described in claim 6, wherein the two knives adjacent to and on opposite sides of said center knife mounted on said first guide member are each narrower in width than the other knife members in said first chain of knife members, and wherein the two knives adjacent to and on opposite sides of said center knife mounted on said second guide member are each narrower in width than the other knife members in said second chain of knife members.

8. The apparatus described in claim 7, wherein said apparatus further includes right-hand vertical positioning means interconnected with said right-hand mounting means for pivotally driving said first and second gripping arms respectively about said first and second pivot means, and left-hand vertical positioning means interconnected with said left-hand mounting means for pivotally driving said third and fourth gripping arms respectively about said third and fourth pivot means.

9. The apparatus described in claim 8, wherein said right-hand vertical positioning means comprises a first right-hand hydraulic cylinder pivotally connected at one end with said right-hand mounting means and containing a first right-hand piston rod having its free traveling end interconnected with said first and second gripping arms, and wherein said left-hand vertical positioning means comprises a first left-hand hydraulic cylinder pivotally connected at one end with said left-hand mounting means and containing a first left-hand piston rod having its free traveling end interconnected with said third and fourth gripping arms.

10. The apparatus described in claim 9, wherein said right-hand mounting means comprises a right-hand outer sleeve member hingedly interconnected with the end of said right-hand support arm assembly, and a right-hand inner sleeve member slidably disposed in said right-hand outer sleeve member and having said first and second gripping arms pivotally mounted at one end on said first and second pivot means;

and wherein said left-hand mounting means also comprises a left-hand outer sleeve member hingedly interconnected with the end of said left-hand support arm assembly, and a left-hand inner sleeve member slidably disposed in said left-hand outer sleeve member and having said third and fourth gripping arms pivotally mounted at one end on said third and fourth pivot means.

11. A tree harvester including delimbing means having articulately coupled knife blades for circumferentially engaging the trunk of a felled tree, said delimbing means including first and second assemblies each carrying said knife blades and arranged to engage a tree trunk at longitudinally offset locations, each knife blade assembly covering an arc of at least 180° about a tree trunk and each assembly including a pair of curvilinear gripping arms, said gripping arms respectively being coupled to the ends of said articulately coupled knife blades and pivotally mounted on a housing, said knife blade assemblies being independently supported by the pivotal coupling to the ends of the gripping arms for engaging a tree trunk independently of said gripping arms during a delimbing operation.

12. The apparatus of claim 11 and further including a guide arm slidably mounted in said housing and attached to a centrally located knife blade.

13. The apparatus of claim 11 wherein said housing includes reciprocally mounted members, said arms being pivotally mounted on one of said members, and means for moving said members relative to one another.

14. The apparatus of claim 11 and further including a movable vehicle, and arm means pivotally coupling said first and second assemblies to said vehicle.

15. The apparatus of claim 11 wherein said articulately coupled knife blades include hinges between each knife blade, said hinges being sized to space the cutting edge of the knife blades from the bark of the tree.

16. The apparatus of claim 15 wherein said knife blades have forward cutting edges and rearward recesses to receive said hinges and thereby provide a nearly continuous cutting surface.

17. The apparatus of claim 11 wherein said knife blades have perpendicularly disposed stop arms to engage forward surfaces of said gripping arms.

18. The apparatus of claim 11 and further including means respectively coupled to each of said gripping arms for applying force to said arms.

19. The apparatus of claim 18 wherein said gripping arms are respectively comprised of pivoted arm means.

20. The apparatus of claim 19 wherein said force applying means are mounted on said housing,
a fixed frame slidably supporting said housing, and power means for moving said housing relative to said fixed frame.

21. A tree harvester comprising
a movable vehicle having a frame support mounted on forward and rearward sets of wheels,
delimbing means mounted on said frame,
said delimbing means including first and second support arm means pivotally coupled to said frame and spaced from one another between the front set of wheels,
first and second hinge blocks respectively pivotally coupled to said first and second support arm means, means for moving said support arm means between upper and lower positions relative to said frame whereby in said lower position the arm means may be disposed on opposite sides of a felled tree,
first and second housing means respectively pivotally mounted on said first and second hinge blocks on axes to permit rotation of the housing means in a direction transverse to the pivotal movement of the support arm means, said housing means respectively having a reciprocally mounted member, means for reciprocally moving said member relative to the housing means,
a pair of curvilinear gripping arms having ends pivotally coupled to said reciprocally mounted member and arranged to permit rotation of the gripping arms in a direction transverse to the pivotal movement of the housing,
articulately coupled knife blade assemblies coupled to the other ends of said gripping arms, each knife blade assembly covering an arc of at least 180°, said delimbing means being constructed and arranged so that said knife blades engage a felled tree at offset locations.